US006874313B2

(12) United States Patent
Yurgil et al.

(10) Patent No.: US 6,874,313 B2
(45) Date of Patent: Apr. 5, 2005

(54) AUTOMOTIVE CATALYST OXYGEN STORAGE CAPACITY DIAGNOSTIC

(75) Inventors: James R. Yurgil, Livonia, MI (US); John M. Gunselman, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 21 days.

(21) Appl. No.: 10/368,894

(22) Filed: Feb. 18, 2003

(65) Prior Publication Data

US 2004/0159094 A1 Aug. 19, 2004

(51) Int. Cl.[7] .................................................. F01N 3/00

(52) U.S. Cl. ............................ 60/277; 60/274; 60/276; 60/285; 123/198 F

(58) Field of Search .......................... 60/274, 276, 277, 60/285; 123/198 F, 481

(56) References Cited

U.S. PATENT DOCUMENTS 5,431,011 A 7/1995 Casarella et al. ............ 60/274
6,226,982 B1 * 5/2001 Poggio et al. ................ 60/276
6,282,889 B1 * 9/2001 Kakuyama et al. ........... 60/285
6,289,673 B1 * 9/2001 Tayama et al. ............... 60/285
6,381,954 B1 * 5/2002 Kakuyama et al. ........... 60/285
6,405,527 B2 * 6/2002 Suzuki et al. ................. 60/285
6,622,478 B2 * 9/2003 Nakamura ................... 60/285

* cited by examiner

*Primary Examiner*—Tu M. Nguyen
(74) *Attorney, Agent, or Firm*—Christopher DeVries

(57) ABSTRACT

An engine exhaust system includes a catalytic converter. An inlet sensor senses a first oxygen level of exhaust gases entering the catalytic converter. An outlet sensor senses a second oxygen level of exhaust gases exiting the catalytic converter. A controller communicates with a fuel system of an engine, the inlet sensor, and the outlet sensor. The controller initiates a rich condition after a fuel cut-off period and calculates a mass of oxygen released by the catalytic converter based on a mass air flow into the engine. The controller calculates a target oxygen storage capacity (OSC) of the catalytic converter over a target time period.

22 Claims, 5 Drawing Sheets

AUTOMOTIVE CATALYST OXYGEN STORAGE CAPACITY DIAGNOSTIC

FIELD OF THE INVENTION

The present invention relates to diagnostic systems for vehicles, and more particularly to a method and apparatus for monitoring catalytic converter efficiency.

BACKGROUND OF THE INVENTION

During the combustion process, gasoline is oxidized and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems include a catalytic converter that reduces the levels of CO, HC, and NOx in the exhaust gas by chemically converting these gasses into carbon dioxide, nitrogen, and water. Diagnostic regulations require periodic monitoring of the catalytic converter for proper conversion capability. Typical monitoring methods employ two exhaust gas oxygen sensors and infer the conversion capability of the catalytic converter using the sensor signals. One sensor monitors the oxygen level associated an inlet exhaust stream of the catalytic converter. This inlet $O_2$ sensor is also the primary feedback mechanism that maintains the fuel-to-air (F/A) ratio of the engine at the chemically correct, or stoichiometric F/A ratio needed to support the catalytic conversion processes. A second or outlet $O_2$ sensor monitors the oxygen level concentration of the exhaust stream exiting the catalytic converter. Excess $O_2$ concentration in the exiting exhaust stream induces a "lean" sensor signal. A deficit or absence of $O_2$ in the exiting exhaust stream induces a "rich" sensor signal.

Exhaust stream $O_2$ sensors are categorized as either narrow range or wide range. The terms narrow and wide refer to the size of the F/A window that the $O_2$ sensor varies in an analog fashion. Narrow range exhaust stream $O_2$ sensors are sometimes referred to as "switching" sensors. These sensors transition between lean and rich sensor signals in a narrow F/A ratio range that brackets the stoichiometric F/A ratio. Wide range exhaust steam $O_2$ sensors widen the analog transition range into the lean F/A ratio range to control engines having stratified charge or lean burn combustion.

Traditional monitoring methods relate the empirical relationships that exist between the inlet and outlet $O_2$ sensor to quantify catalyst conversion capability. These methods compare sensor amplitude, response time, response rate, and/or frequency content data. All of these measurements are affected by a property of a catalytic converter known as Oxygen Storage Capacity (OSC). OSC refers to the ability of a catalytic converter to store excess oxygen under lean conditions and to release oxygen under rich conditions. The amount of oxygen storage and release decreases as the conversion capability of the catalytic converter is reduced. Therefore, the loss in OSC is related to the loss in conversion capability.

SUMMARY OF THE INVENTION

An engine exhaust system according to the present invention includes a catalytic converter. An inlet sensor senses a first oxygen level of exhaust gases entering the catalytic converter. An outlet sensor senses a second oxygen level of exhaust gases exiting the catalytic converter. A controller communicates with a fuel system of an engine, the inlet sensor, and the outlet sensor. The controller initiates a rich condition after a fuel cut-off period and calculates a mass of oxygen released by the catalytic converter based on a mass air flow into the engine. The controller calculates a target oxygen storage capacity (OSC) of the catalytic converter over a target time period.

In one feature, the target time period is based on an inlet sensor delay time to detect a first condition and an outlet sensor delay time to detect said first condition.

In another feature, the target time period is further based on a lag time. The lag time is an amount of time required for a mass of air to flow through a catalytic converter.

In yet another feature, the first condition is a stoichiometric fuel to air (F/A) ratio of the exhaust gases.

In still another feature, the catalytic converter is saturated with oxygen during the fuel cut-off period.

In a further feature, the rich condition lasts for a transition period. The controller stores measurements needed to calculate the oxygen released from the catalytic converter at sub-intervals of the transition period. The controller determines said target time period after said transition time period.

In a final feature, the target OSC is compared to a reference OSC to diagnose a conversion capability of the catalytic converter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
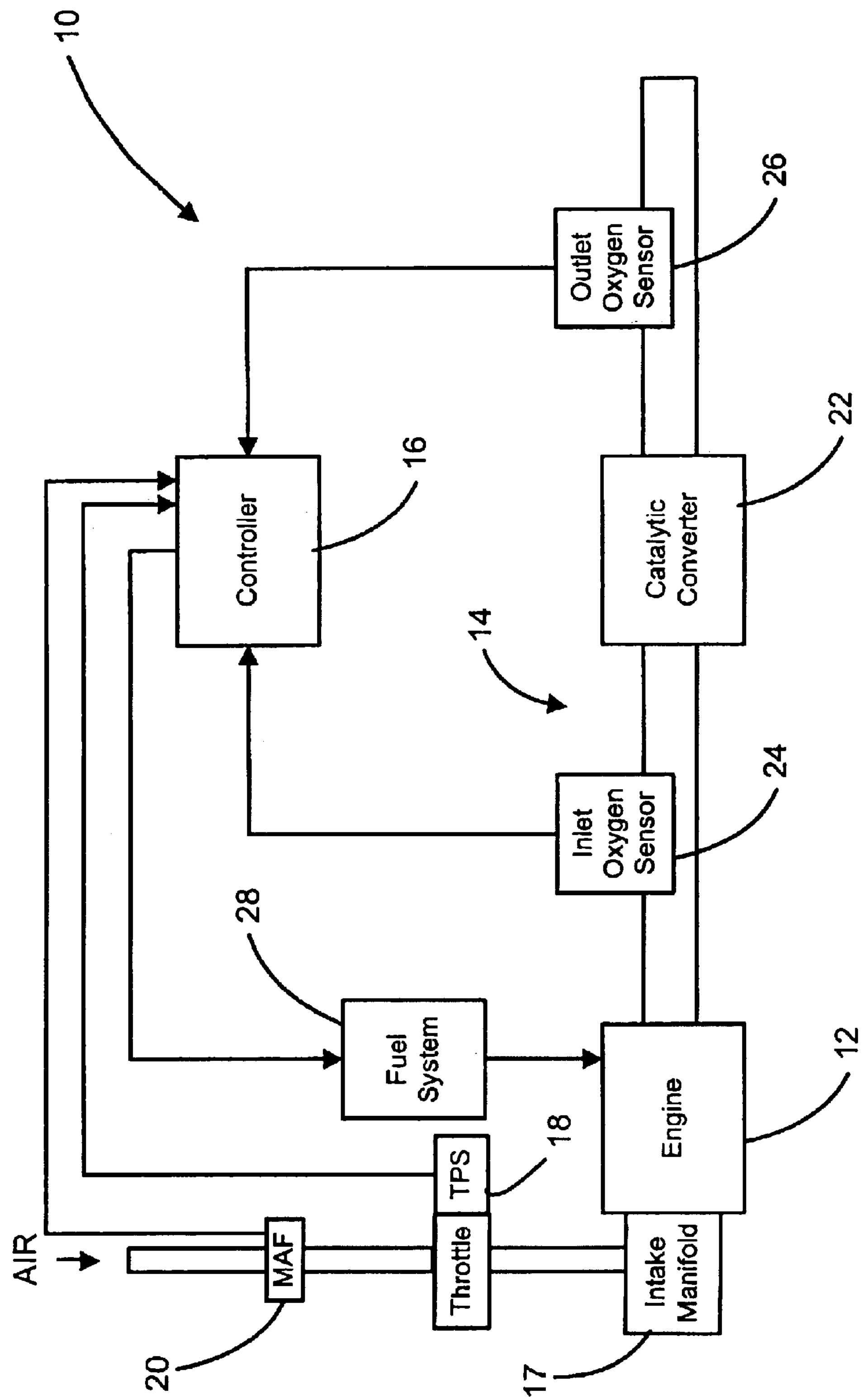
FIG. 1 is a functional block diagram of a vehicle including a controller that performs an oxygen storage capacity diagnostic according to the present invention.

The following description of the preferred embodiment is merely exemplary in nature and is in no way intended to limit the invention, its application, or uses. For purposes of clarity, the same reference numbers will be used in the drawings to identify similar elements.

Referring now to FIG. 1, a vehicle 10 includes an engine 12, an exhaust 14 and a controller 16. The engine 12 includes an intake manifold 17, a throttle position sensor (TPS) 18 and a mass air flow (MAF) sensor 20. The throttle position sensor 18 and the MAF sensor 20 communicate with the controller 16. The exhaust 14 includes a catalytic converter 22, a pre-catalyst or inlet oxygen sensor 24, and a post-catalyst or outlet oxygen sensor 26. The inlet and outlet oxygen sensors 24, 26 communicate with the controller 16 to provide inlet and outlet F/A ratio signals, respectfully. The controller 16 communicates with a fuel system 28 to regulate fuel flow to the engine 12. In this manner, the controller 16 regulates the F/A ratio of the engine 12.

Referencing FIG. 2, a simplified chemical combustion model for hydrocarbon fuels will be described in details. The combustion model is based on an equivalence ratio ($F_R$) that is defined as the actual F/A ratio ($F/A_{ACT}$) divided by the stoichiometric F/A ratio ($F/A_{STOICH}$). During periods of $O_2$ release (i.e. rich engine operation), the chemical combustion model is provided as:

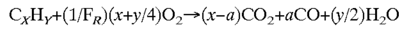

$$C_XH_Y+(1/F_R)(x+y/4)O_2\rightarrow(x-a)CO_2+aCO+(y/2)H_2O$$

During periods of $O_2$ storage, the chemical combustion model is provided as:

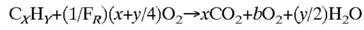

$$C_XH_Y+(1/F_R)(x+y/4)O_2\rightarrow xCO_2+bO_2+(y/2)H_2O$$

The coefficients a and b are respectively provided as:

$$a=2(1-1/F_R)(x+y/4);\ \text{moles of excess CO}$$

$$b=(1/F_R-1)(x+y/4);\ \text{moles of excess } O_2$$

Periods of $O_2$ release require the catalyst to release ½ Mole of $O_2$ for each Mole of excess CO in the exhaust to completely convert the CO. Periods of $O_2$ storage require the catalyst to store one mole of $O_2$ for each mole of excess $O_2$ in the exhaust. The ratio of $O_2$ released by the catalyst to the mass of inlet $O_2$ in the F/A charge mixture is given as:

$$[(1-1/F_R)(x+y/4)[/](1/F_R)(x+y/4)]=F_R-1$$

A positive term indicates $O_2$ release and a negative term indicates $O_2$ storage.

Figure 2:
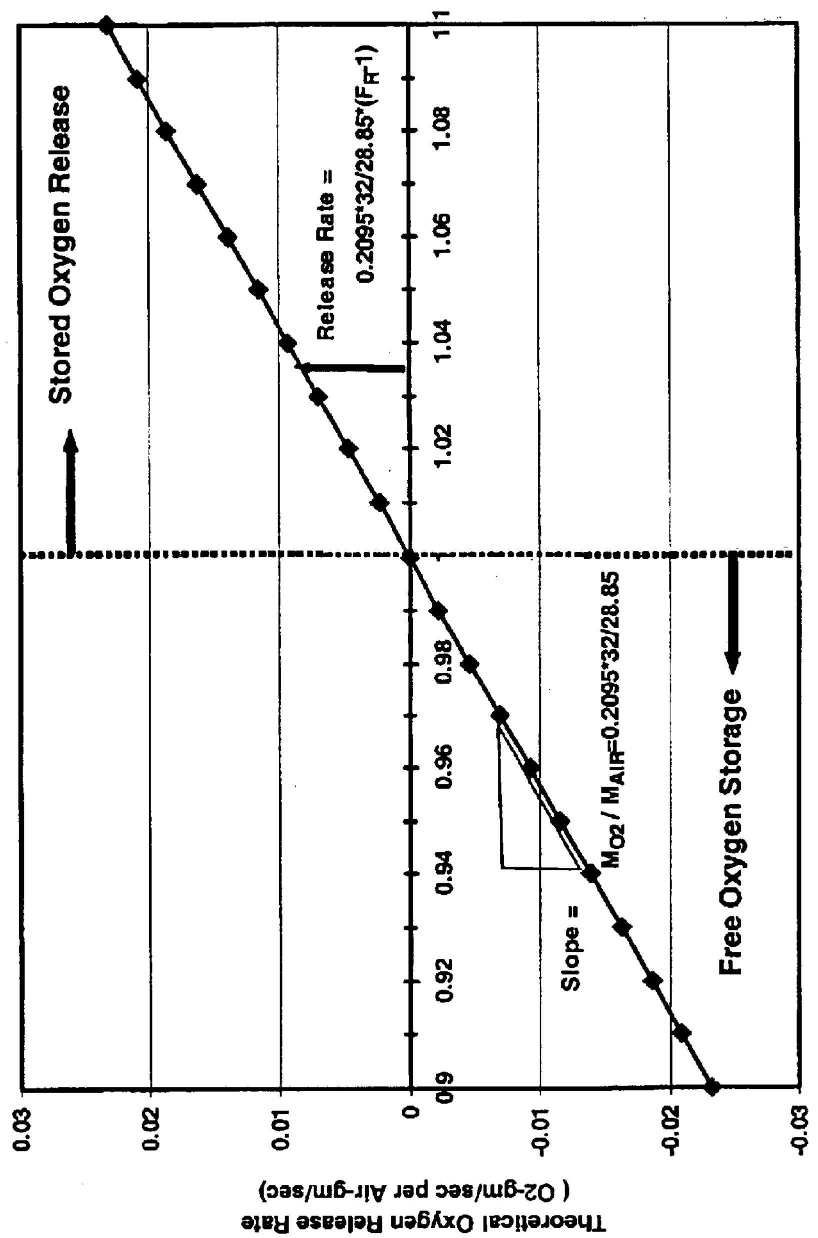
FIG. 2 is a graph illustrating a simplified chemical combustion model for hydrocarbon fuels.

As seen in the graph of FIG. 2, when $F_R$ is greater than 1 (i.e., rich engine operation), stored $O_2$ within the catalytic converter 22 is released. When $F_R$ is less than 1 (i.e., lean engine operation), excess $O_2$ is stored. The rate of $O_2$ released to the mass air rate associated with the F/A mixture is provided as:

$$(M_{O2}/M_{AIR})(F_R-1);\ O_2 \text{ grams per sec/Air grams per sec}$$

$M_{O2}$ is the mass of $O_2$ in a mole of air. $M_{AIR}$ is the average molar mass of air. The molar ratio of $O_2$ to that of air is assumed to be a constant.

The oxygen storage capacity (OSC) diagnostic of the present invention in independent of the particular hydrocarbon fuel being used. In other words, the OSC diagnostic is valid for any ratio of x and y in the $C_XH_Y$molecules. Additionally, the OSC diagnostic is based on a physical model, which is based on chemical principles and not empirical observation.

The OSC diagnostic of the present invention is executed during a fuel cut-off mode of the engine 12. The fuel cut-off mode occurs in a vehicle overrun condition, such as when the vehicle 10 is coasting downhill. While in the fuel cut-off mode, the F/A ratio of the exhaust stream from the engine 12 is equal to zero. The OSC diagnostic is initiated after the engine 12 has operated in the fuel cut-off mode for a predetermined period of time and is signaled to return to normal operation (or non fuel cut-off mode). More specifically, the predetermined time period is calibrated to completely saturate the catalytic converter 22 with oxygen.

Figure 3:
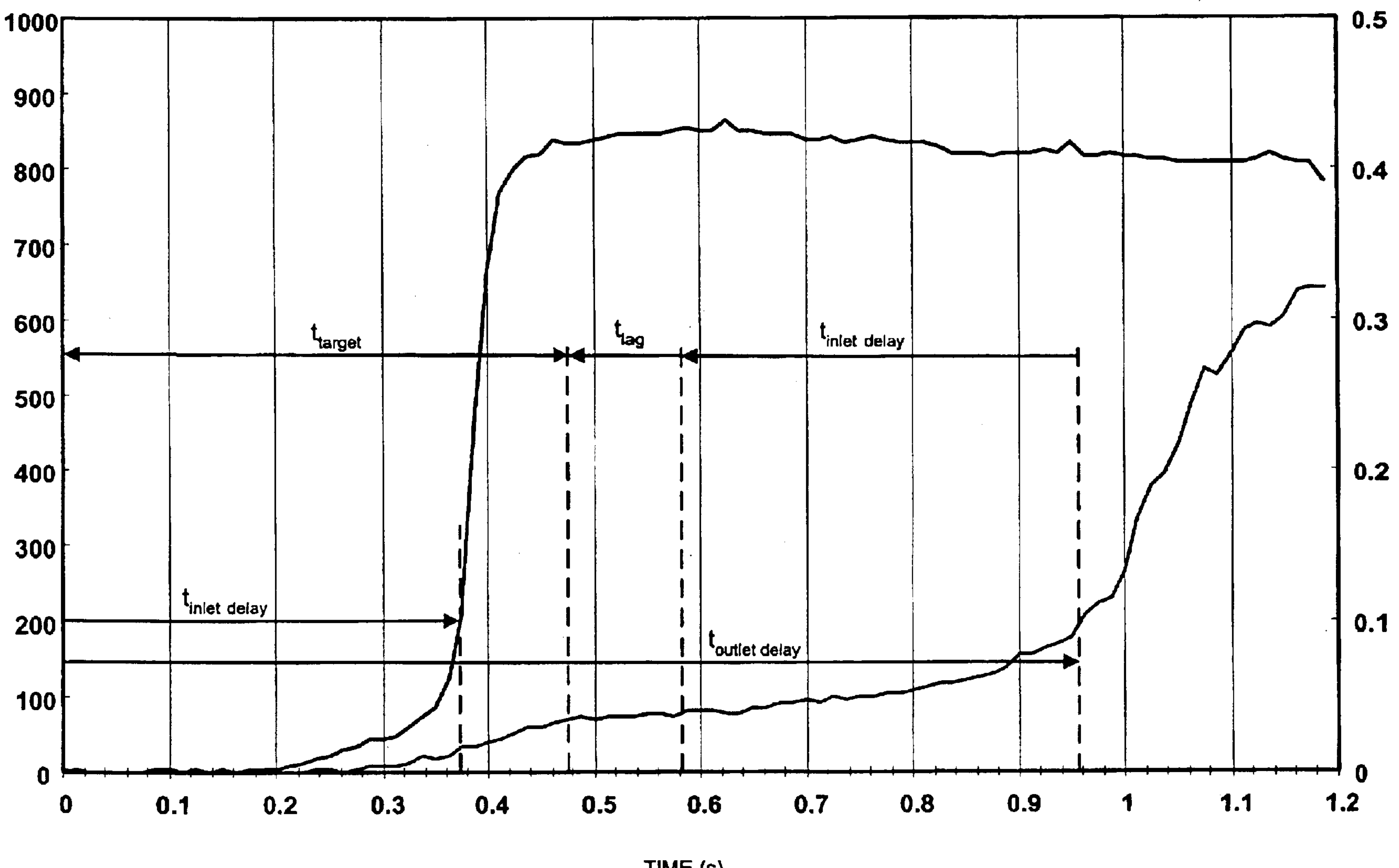
FIG. 3 is a graph illustrating inlet and outlet $O_2$ sensor responses during a data collection period.
Figure 4:
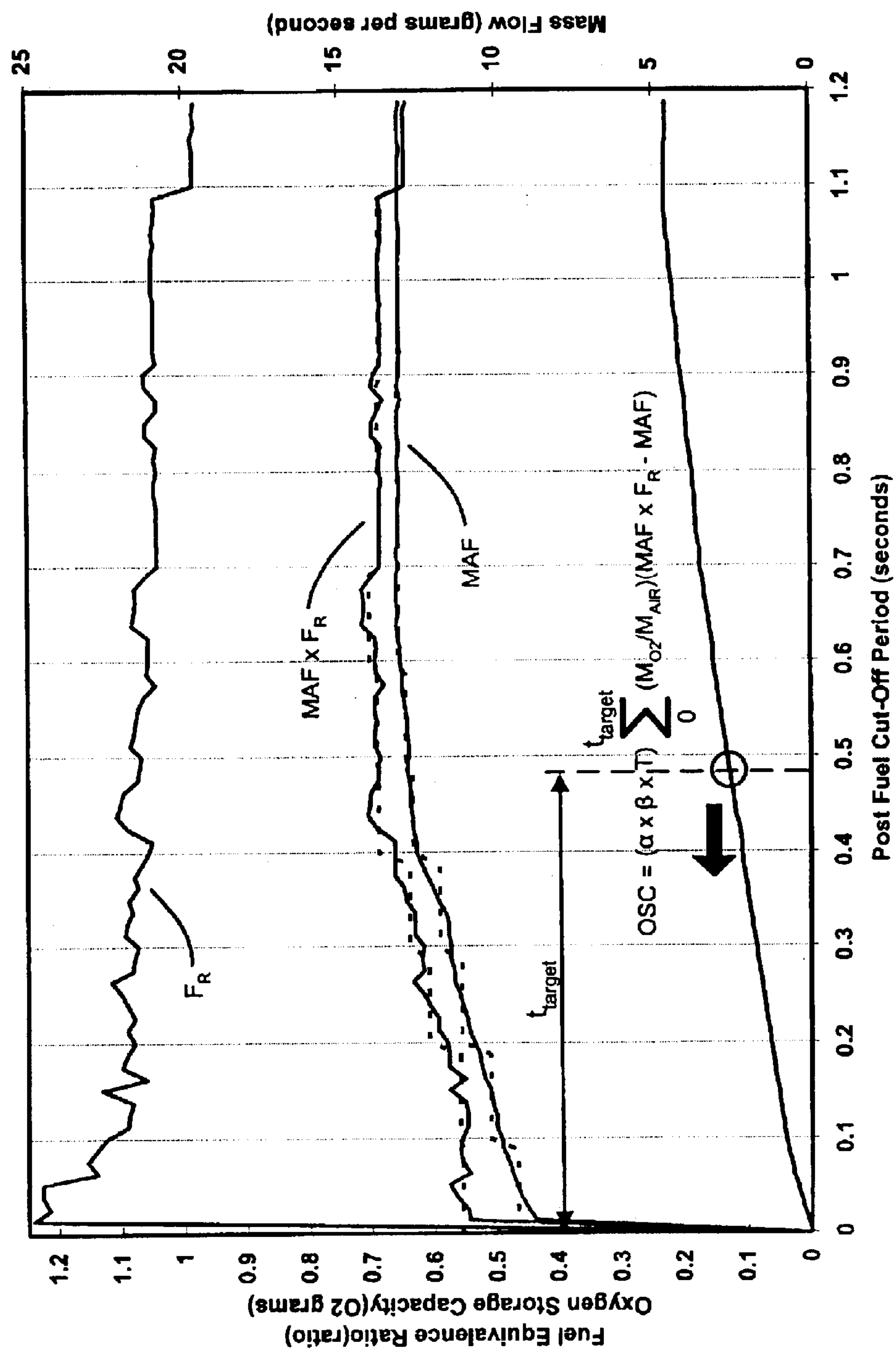
FIG. 4 is a graph illustrating an oxygen storage capacity (OSC) calculation.

Referring now to FIGS. 3 and 4, time t=0 indicates the beginning of the OSC diagnostic. Initially, $F_R$ is commanded to a fixed percentage rich. Commanding the equivalence ratio a fixed percentage rich results in $F/A_{ACT}$ being greater than $F/A_{STOICH}$. As the engine 12 operates rich, the inlet oxygen sensor 24 detects the transition to rich and correspondingly signals the controller 16. The delay time required for the inlet oxygen sensor 24 to achieve a reference signal is indicated as $t_{inlet\ delay}$. The reference signal indicates when the exhaust from the engine 12 achieves $F/A_{STOICH}$. The outlet oxygen sensor 26 detects the transition to rich and correspondingly signals the controller 16. The outlet oxygen sensor signal is delayed relative to the inlet oxygen sensor signal. The transition time required for the outlet oxygen sensor 26 to achieve the reference signal is indicated as $t_{outlet\ delay}$. The lag time required for a predetermined amount of air (such as approximately 1.5 g) to flow through an inert catalytic converter is indicated as $t_{lag}$.

The OSC diagnostic determines a target time over which a target OSC of the catalytic converter 22 is calculated. The target time, indicated as $t_{target}$, is based on $t_{inlet\ delay}$, $t_{outlet\ delay}$, and $t_{lag}$. More specifically, the controller 16 monitors the inlet and outlet sensor signals to determine $t_{inlet\ delay}$ and $t_{outlet\ delay}$. The controller 16 estimates $t_{lag}$ as the interval of time required to pass a fixed mass of air between the oxygen sensors as:

$$t_{lag}=K\ air\_mass\_grams/MAF(t_{end\text{-}of\text{-}test})$$

This process assumes that exhaust flow conditions toward the end-of-test are known. Referring to FIG. 3, the end-of-test time can be estimated as:

$$t_{end\text{-}of\text{-}test}=t_{outlet\ delay}-t_{inlet\ delay}$$

This instant in time will vary with the OSC of the catalyst and cannot be determined until after the test conditions have passed. Also, the mass flow rate of air is transient in nature during the diagnostic and cannot be assumed to be constant. For these reasons, MAF is averaged over fixed duration subintervals of the transition period and stored. The estimated lag period is then calculated by a backwards integration of the stored MAF terms beginning at $t=t_{end\text{-}of\text{-}test}$ and ending when the summation equals K air_mass_grams. By definition, this occurs at $t=t_{end\text{-}of\text{-}test}-t_{lag}$. The target time is provided as:

$$t_{target}=t_{outlet\ delay}-t_{inlet\ delay}-t_{lag}$$

The target time is the time period immediately after F/A becoming greater than the stoichiometric F/A.

In addition to monitoring the above-described times, the controller 16 stores subinterval averages of the mass air flow (MAF) into the engine 16 and an $F_R$ compensated MAF term (see FIG. 4). The subinterval is defined as an integer multiple of the data sample rate associated with the MAF and $F_R$ terms. This method does not preclude having the subinterval equal the sample rate and subinterval average based on a single value. However, a more efficient use of controller memory can be obtained without significantly affecting the accuracy of the OSC calculation by specifying a larger subinterval. The MAF is provided as a signal to the controller 16 from the MAF sensor 20. The incremental OSC, derived from the simplified O2 release model, is represented by the following relationship:

$$\partial OSC=\alpha[MAF(t)\times\beta][F_R(t)-1]\partial t$$

where the incremental OSC is measured in terms of grams of stored oxygen per unit time, α is the mass of oxygen in a mole of air divided by the mass of a mole of air, and $\beta$ is the mass air flow fraction per catalytic converter. Preferably, for an exhaust system having a single catalytic converter, $\beta$ is equal to 1. For an exhaust system having a catalytic converter for each N/2 cylinders, $\beta$ is equal to 0.5. The OSC at $t_{target}$ is represented by the numerical integration, or summation, of the incremental OSC over the target period:

$$OSC=\alpha\times\beta\times T\times\Sigma[MAF(nT)][F_R(nT)-1],\ n=0 \text{ to } t_{target}/T$$

where T represents the sampled data period, MAF(nT) represents the MAF at time nT, and $F_R$(nT) represents the fuel equivalence ratio at time nT. A prefered equivalent form of this relationship is represented by:

$$OSC=\{\Sigma[MAF(nT)\times F_R(nT)\ ]-\Sigma[MAF(nT)]\}\times(\alpha\times\beta\times T)n=0 \text{ to } T_{target}/T$$

This form is less prone to numerical accumulation of small round-off errors.

Once the outlet oxygen sensor 26 achieves the reference signal (i.e., detects $F/A_{STOICH}$ of the exhaust gases from the catalytic converter), the controller 16 determines the target OSC. Referring again to FIG. 4, to determine the target OSC, the controller 16 calculates the OSC according to the prefered OSC relationship stated previously. The controller 16 integrates both the stored compensated MAF and stored MAF measurements over the target time. This corresponds to the area under each of their respective curves. The difference between these areas, graphically represented by the area between the two curves, is then multiplied by the constant term, $\alpha\times\beta\times T$ to obtain the OSC over the target period. The constant term acts as a scalar that optionally could be omitted if an unscaled result was desirable. The calculated OSC is compared to a reference OSC value to determine if the catalytic converter 22 passes or fails.

Figure 5:
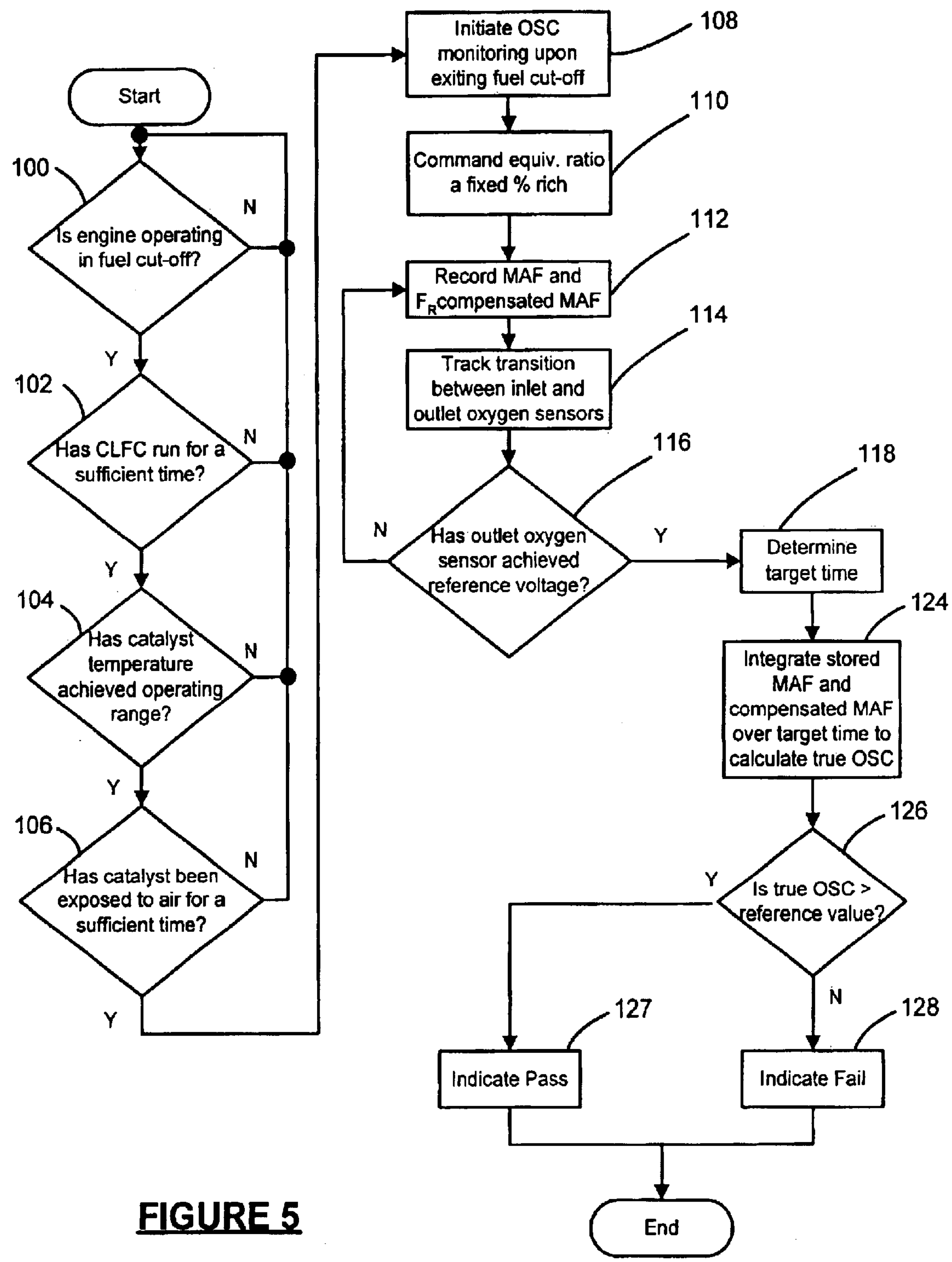
FIG. 5 is a flowchart detailing steps of the oxygen storage capacity (OSC) diagnostic according to the present invention.

Referring to FIG. 5, the diagnostic control determines whether a fuel cut-off mode is present in step 100. If the fuel cut-off mode is not present, control loops back. Otherwise, control checks particular conditions in steps 102, 104, and 106 prior to initiating monitoring. In step 102, control determines whether the engine 12 has been operating under closed loop fuel control (CLFC) for a sufficient time. If not, control loops back to step 100. If true, control determines whether the catalytic converter 22 has achieved an operating temperature in step 104. If the temperature has not been achieved, control loops back to step 100. If the temperature has been achieved, control continues with step 106. In step 106, control determines whether the catalytic converter 22 has been exposed to air flow for a time sufficient to achieve oxygen saturation. If the catalytic converter 22 has not been sufficiently exposed, control loops back to step 100. If true, control initiates the OSC diagnostic upon the engine 12 exiting fuel cut-off in step 108.

Upon exiting the fuel cut-off mode, control commands $F_R$ to a fixed percentage rich in step 110. In step 112, control continuously records subinterval measurements of the MAF and $F_R$ compensated MAF using the MAF sensor 20 as explained above. In step 114, control tracks the signals of the inlet and outlet oxygen sensors 24, 26. In step 116, control determines whether the outlet oxygen sensor 26 has achieved the reference signal. If true, control continues with step 118. If not, control loops back to step 112. In step 118, control determines $t_{outlet\ delay}$, $t_{inlet\ delay}$, $t_{lag}$, and $t_{target}$ therefrom. In step 124, control integrates the stored OSC related quantities over the target time and obtains the target OSC value using the preferred difference equation provided above. In step 126, control determines whether the target OSC value is above the reference value. If false, test failure is indicated in step 128. If true, test pass is indicated in step 127.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of monitoring a catalytic converter comprising:
   - producing a rich exhaust stream from an engine;
   - calculating a mass of oxygen released by said catalytic converter based upon mass air flow into said engine;
   - calculating a target oxygen storage capacity (OSC) of said catalytic converter over a target time period;
   - determining a transport lag time;
   - determining said target time period based on said lag time; and
   - wherein said transport lag time is an amount of time required for predetermined mass of air to flow through a catalytic converter.

2. The method of claim 1 further comprising:
   - determining a first delay time for an inlet oxygen sensor to detect a first condition;
   - determining a second delay time for an outlet oxygen sensor to detect said first condition; and
   - calculating said target time period based on said first and second delay times.

3. The method of claim 1 further comprising saturating said catalytic converter with oxygen during a fuel cut-off period.

4. The method of claim 1 further comprising:
   - determining a pass/fail status of said target OSC; and
   - signaling said pass/fail status.

5. The method of claim 1 wherein said rich exhaust stream is produced for a transition period.

6. The method of claim 5 wherein said controller stores measurements of oxygen mass air flow (MAF) at subintervals of said transition period.

7. The engine exhaust system of claim 5 wherein said controller determines said target time period after said transition time period.

8. A method of monitoring a catalytic converter comprising:
   - saturating said catalytic converter with oxygen during a fuel cut-off period;
   - operating an engine in a rich condition after said fuel cut-off period;
   - calculating a mass of oxygen released by said catalytic converter based upon mass air flow into said engine;
   - calculating a target OSC based on said mass of oxygen released over a target time period
   - determining a transport lag time required for a mass of air to flow through an inert catalytic converter; and
   - calculating said target time period based on said transport lag time.

9. The method of claim 8 wherein said rich condition includes an actual fuel-to-air (F/A) ratio greater than a stoichiometric F/A ratio.

10. The method of claim 8 further comprising:

determining a pass/fail status of said target OSC; and signaling said pass/fail status.

11. The method of claim 8 further comprising:

determining a first delay time for an inlet oxygen sensor to detect a first condition;

determining a second delay time for an outlet oxygen sensor to detect said first condition; and calculating said target time period based on said first and second delay times.

12. The method of claim 11 wherein said first condition is a fuel-to-air (F/A) ratio of an exhaust stream achieving a predetermined level.

13. The method of claim 8 wherein said rich exhaust stream is produced for a transition period.

14. The method of claim 13 wherein said controller stores measurements of mass air flow (MAF) at sub-intervals of said transition period.

15. The engine exhaust system of claim 13 wherein said controller determines said target time period after said transition time period.

16. An engine exhaust system comprising:

a catalytic converter;

an inlet sensor that senses a first oxygen level of exhaust gases entering said catalytic converter;

an outlet sensor that senses a second oxygen level of exhaust gases exiting said catalytic converter;

a controller that communicates with a fuel system of an engine, said inlet sensor and said outlet sensor, that initiates a rich condition after a fuel cut-off period, that calculates a mass of oxygen released by said catalytic converter based on a mass air flow into said engine, and that calculates a target oxygen storage capacity (OSC) over a target time period;

wherein said target time period is based on an inlet sensor delay time to detect a first condition and an outlet sensor delay time to detect said first condition;

wherein said target time period is further based on a lag time; and wherein said lag time is an amount of time required for a mass of air to flow through a catalytic converter.

17. Tho engine exhaust time of claim 16 wherein said first condition is a stoichiometric fuel to air (F/A) ratio of said exhaust gases.

18. The engine exhaust s stem of claim 16 wherein said catalytic converter is saturated with oxygen during said fuel cut-off period.

19. The engine exhaust system of claim 16 wherein said target OSC is compared to a reference OSC to diagnose a conversion capability of said catalytic converter.

20. The engine exhaust system of claim 16 wherein said rich condition last for a transition period.

21. The engine exhaust system of claim 20 wherein said controller stores measurements of mass air flow (MAF) at sub-intervals of said transition period.

22. The engine exhaust system of claim 20 wherein said controller determines said target time period after said transition time period.

* * * * *